US006429237B2

(12) United States Patent
Tooley

(10) Patent No.: US 6,429,237 B2
(45) Date of Patent: Aug. 6, 2002

(54) WIRE COATING COMPOSITIONS

(75) Inventor: Patricia A. Tooley, Vienna, WV (US)

(73) Assignee: E. I. du Pont de Nemours & Company, Wilmington, DE (US)

( * ) Notice: Subject to any disclaimer, the term of this patent is extended or adjusted under 35 U.S.C. 154(b) by 0 days.

(21) Appl. No.: 09/832,429

(22) Filed: Apr. 11, 2001

Related U.S. Application Data

(60) Provisional application No. 60/196,945, filed on Apr. 13, 2000.

(51) Int. Cl.$^7$ .................................................. C08K 3/22
(52) U.S. Cl. ........................................ 523/216; 524/497
(58) Field of Search ............................ 523/216; 524/497

(56) References Cited

U.S. PATENT DOCUMENTS

| 2,885,366 A | 5/1959 | Iler |
| 3,523,810 A | 8/1970 | Swank |
| 3,549,091 A | 12/1970 | Slepetys |
| 3,591,398 A | 7/1971 | Angerman |
| RE27,818 E | 11/1973 | Werner |
| 3,859,109 A | 1/1975 | Wiseman et al. |
| 4,416,699 A | 11/1983 | Jacobson |
| 4,427,451 A | 1/1984 | Baloga |
| 4,460,655 A | 7/1984 | Jacobson |
| 4,810,305 A | 3/1989 | Braun et al. |
| 5,562,990 A | 10/1996 | Tooley et al. |
| 5,677,404 A | 10/1997 | Blair |
| 5,700,889 A | 12/1997 | Blair |
| 5,703,185 A | 12/1997 | Blair |
| 5,753,025 A | 5/1998 | Bettler et al. |
| 5,789,466 A | 8/1998 | Birmingham, Jr. et al. |
| 6,200,375 B1 | 3/2001 | Guez et al. |

FOREIGN PATENT DOCUMENTS

| EP | 0447032 A2 | 9/1991 |
| EP | 0959108 A1 | 11/1999 |
| JP | 03134912 | 6/1991 |
| WO | 98/20071 | 5/1998 |

Primary Examiner—Paul R. Michl

(57) ABSTRACT

A process for high speed melt extrusion onto wire conductors of fluoropolymer pigmented with oxide-coated titanium dioxide.

20 Claims, No Drawings

US 6,429,237 B2

WIRE COATING COMPOSITIONS

This application claims benefit of Serial No. 60/196,945 filed Apr. 13, 2000.

FIELD OF THE INVENTION

This invention relates to the high-speed extrusion coating of wire conductors with pigmented fluoropolymers.

BACKGROUND OF THE INVENTION

Melt-processible fluoropolymers are widely used as insulation for conductors, i.e. wires. "Plenum cable" is one such use. Plenum cable is used for telephone, computer, and similar wiring in office buildings, schools, etc. Fluoropolymer coating on the wire makes a superior insulation because it is not flammable. A further advantage of fluoropolymers is their low dielectric constant, a desirable property in communications wire insulation.

Melt-processible fluoropolymers are applied to wire by melt extrusion on wire-coating equipment whose design is well-known to those skilled in the art. The wires are generally used in pairs, often called "twisted pairs", and to distinguish the paired wires, the insulation is colored. One wire of the pair is white, and the other is blue or red or another non-white color, so that not only may the paired wires be distinguished from one another, but also the twisted pairs may be distinguished from one another by the various colors of the non-white insulated wire. U.S. Pat. No. 5,789,466 describes white pigmentation of fluoropolymers using titanium dioxide ($TiO_2$) coated with silane.

Wire coating is typically done at about 1500 ft/minute (7.6 m/s). This is referred to as the "line speed". The melt viscosity of the polymer is a factor that limits the line speed. As line speed is increased, a point is reached at which the appearance and quality of the coating begin to deteriorate. This deterioration shows up as surface roughness, variation in coating thickness, such as lumps of polymer at intervals along the wire, and defects in the insulating quality of the coating, known as "sparks".

For more efficient use of the wire coating equipment and greater productivity, it is desirable that line speeds be increased without loss of coating quality. In fact, the standards of quality of the insulation are higher than in the past because the demand for faster and more nearly error-free transmission is increasing. Polymers have been developed recently that can be extruded on wire at speeds of 2500 feet/minute (12.7 m/s), preferably 3000 feet/minute (15 m/s). However, white pigment traditionally used in fluoropolymers for wire coating does not perform well in high-speed extrusion, but gives insulation having unacceptable levels of lumps and sparks.

There is a need for white pigmented fluoropolymer compositions that can be extruded at high speed onto wire to give insulation with few or no lumps or sparks.

SUMMARY OF THE INVENTION

In one embodiment, this invention is a process for the coating of a conductor comprising melt extruding onto said conductor a blend comprised of
(a) melt-processible fluoropolymer having a flex life of greater than about 1000 cycles, and capable of being extruded by itself at at least about 2500 ft/min (12.7 m/s) and
(b) a pigment comprising titanium dioxide coated with one or more layers comprising oxides, or mixtures of oxides, of at least one of silicon and aluminum, said extruding being at a rate of at least about 2000 ft/min (10 m/s) to give a conductor with a coating having no more than about 10 lumps/135,000 ft (41,000 m) or no more than about 10 sparks/135,000 ft (41,000 m).

In a second embodiment, this invention is a composition capable of being melt-extruded onto a conductor at a rate of at least about 2000 ft/min (10 m/s) comprised of (a) melt-processible fluoropolymer having a flex life greater than about 1000 cycles, and capable of being extruded by itself at at least about 2500 ft/min (12.7 m/s) and (b) pigment comprising titanium dioxide coated with one or more layers comprising oxides, or mixtures of oxides, of at least one of silicon and aluminum.

DETAILED DESCRIPTION

The melt-processible fluoropolymer used in the present invention is that special class that is not only by itself capable of high speed extrusion, but which also exhibits excellent physical properties, characterized by high flex life. Thus, the melt-processible fluoropolymers of this invention are preferably comprised of at least one fluoromonomer, have melting points below about 320° C., and have melt flow rates (MFR) of about 15 g/10 min to 50 g/10 min, more preferably of about 20 g/10 min to 40 g/10 min.

Fluoromonomers are monomers containing at least 35 wt % fluorine, preferably at least 50 wt % fluorine, that can be polymerized in the process of this invention include fluoroolefins having 2–10 carbon atoms, and fluorinated vinyl ethers of the formula $CY_2=CYOR$ or $CY_2=CYOR'OR$ wherein Y is H or F, and —R, and —R'— are independently completely-fluorinated or partially-fluorinated alkyl and alkylene groups containing 1–8 carbon atoms. Preferred —R groups contain 1–4 carbon atoms and are preferably perfluorinated. Preferred —R'— groups contain 2–4 carbon atoms and are preferably perfluorinated. Preferred perfluoro(alkyl vinyl ethers) (PAVE) are perfluoro(propyl vinyl ether) (PPVE) and perfluoro(ethyl vinyl ether) (PEVE). More preferred PAVE is PEVE. Preferred fluoroolefins have 2–6 carbon atoms and include TFE, hexafluoropropylene (HFP), chlorotrifluoroethylene (CTFE), vinyl fluoride, vinylidene fluoride ($VF_2$), trifluoroethylene, hexafluoroisobutylene, and perfluorobutyl ethylene (PFBE). More preferred fluoroolefins are TFE and HFP.

The fluoropolymers of this invention are melt-processible. By the term "melt-processible" it is meant that the copolymer can be processed (i.e., fabricated into shaped articles such as films, fibers, tubes, wire coatings and the like) by conventional melt extruding means. The fluoropolymers are preferably copolymers, more preferably copolymers of TFE and of CTFE, most preferably copolymers of TFE. These may be copolymers of TFE and of CTFE with other fluoromonomers. They may also be copolymers of TFE and of CTFE with nonfluoromonomers, such as hydrocarbon monomers. Hydrocarbon monomers that copolymerize with some combinations of fluoromonomers include propylene and ethylene. The preferred hydrocarbon monomer is ethylene. By "copolymer" is meant a polymer made by polymerizing two or more monomers.

Examples of useful copolymers include the copolymers of TFE with HFP and/or perfluoro(alkyl vinyl ethers) such as PPVE or PEVE, copolymers of TFE with PMVE, and copolymers of TFE or CTFE with ethylene. Further examples include the copolymers of vinylidene fluoride with HFP, or with HFP and TFE. As implied above, copolymers may contain additional monomers beyond the fluoromonomers named. TFE/ethylene copolymers, for example, are most useful if they include additional monomers that introduce bulky side groups such as PFBE, HFP, PPVE or 2-trifluoromethyl-3,3,3-trifluoro-1-propene.

Preferred copolymers of TFE are copolymers of TFE with HFP, and of TFE with fluorinated vinyl ethers. More preferred are copolymers of TFE, HFP, and PAVE. Most preferred are copolymers of TFE, HFP, and PEVE.

The composition and molecular weight of the fluoropolymer used in the present invention is selected from the foregoing so that the fluoropolymer is not only capable of being extruded at high speed, but also has a good flex life, as measured by ASTM D2176. Capability of extrusion at a rate of at least about 2500 ft/min (12.7 m/s), preferably about 3000 ft/min (15 m/s) is achieved by the fluoropolymer preferably having a melt flow rate of about 15 g/10 min to 50 g/10 min, as measured according to ASTM D-1238T as described in U.S. Pat. No. 4,380,618. The temperature and the weight used in the test depend upon the composition of the fluoropolymer.

Making such high melt flow rate fluoropolymers is not only a matter of reducing molecular weight. Because physical properties of polymers are strongly dependent upon molecular weight, simply reducing molecular weight (increasing melt flow rate) results in loss of properties such as flex life, which are important to applications such as wire insulation. To counteract this tendency, adjustments must be made to the composition of the fluoropolymer, for example by modifying the monomer ratios or altering the monomers used. Examples of specific fluoropolymers designed to have good physical properties, as measured by flex life, at low molecular weight, as measured by melt flow rate, are disclosed in U.S. Pat. Nos. 5,677,404 and 5,703,185. These are copolymers of TFE, HFP, and PEVE. The HFP content of the copolymer of TFE, HFP, and PEVE is from about 6 wt. % to about 16 wt. %. Preferred HFP content is from about 6 wt. % to 10 wt. %. More preferred HFP content is from about 6 wt. % to about 8 wt. %. The PEVE content is from about 0.2 wt. % to about 4 wt. %. Preferred PEVE content is from about 1 wt. % to about 3 wt. %. More preferred PEVE content is from about 1.5 wt. % to about 2.5 wt. %. The flex life of these fluoropolymers (as measured according to ASTM D-2176) is greater than about 1000 cycles, preferably greater than about 2000 cycles, and more preferably greater than about 4000 cycles. One skilled in the art will recognize that other specific fluoropolymers can also be used that possess both high speed extrusion capability and high flex life.

$TiO_2$ for pigment use in the present invention generally is in the rutile or anatase crystalline form. These forms are commonly made, respectively, by a chloride process or by a sulfate process, though the anatase form may be subsequently calcined to the rutile form. In the chloride process, $TiCl_4$ is oxidized to $TiO_2$. In the sulfate process, titanium-containing ore is dissolved in sulfuric acid and the resulting solution goes through a series of steps to yield $TiO_2$. Both processes are described in greater detail in *The Pigment Handbook,* Vol. 1, 2nd ed., John Wiley & Sons, NY (1988). Certain finishing steps are commonly performed on the products of the foregoing processes, such as slurrying if not already a slurry, filtering, washing, drying, and milling with a fluid energy mill. Fluid energy milling involves introducing dry $TiO_2$ pigment and a fluid, e.g., air or steam, into the outer portion of an inwardly spiraling vortex so as to convey the $TiO_2$ at high velocity against the housing of the spiral vortex to fracture aggregates, as described in U.S. Pat. No. 4,427,451. Average $TiO_2$ particle size can be in the range 5–1000 nm, but is usually in the range 150–400 nm for effective performance as a white pigment.

U.S. Pat. No. 5,789,466 discloses that fluoropolymer pigmented with silane-coated $TiO_2$ pigment extrudes well onto a conductor at speeds up to about 1500 ft/minute (7.6 m/s). It is further disclosed that $TiO_2$ with an oxide coating is not a satisfactory pigment for fluoropolymer under these extrusion conditions, giving insulation with many lumps and sparks. In the course of raising the extrusion wire-coating speeds into the range of 2000 to 3000 ft/min (10 to 15 m/s), it has been found that using fluoropolymer pigmented with the silane-coated $TiO_2$ pigment yields wire insulation having faults of the type known as lumps and sparks. Furthermore, and surprisingly, it has been found that fluoropolymer pigmented with $TiO_2$ that has been coated with layers of oxide, or mixtures of oxides, of silicon and aluminum can be extruded at these line speeds and give insulation that has few or no lumps and sparks. This is the reverse of the teaching of U.S. Pat. No. 5,789,466. The oxide coatings described herein may be hydrated, and are sometimes described in the art as hydrous oxides, or oxyhydroxides.

The silica-coated $TiO_2$ is made according to the method disclosed in U.S. Pat. No. 2,885,366. These coatings are known in the art as "dense" coats (U.S. Pat. No. Re. 27,818).

Effective silica-coated $TiO_2$ of this invention need not be "dense". U.S. Pat. No. 3,591,398 describes other silica coatings for $TiO_2$.

$TiO_2$ coated with alumina is effective as a pigment in fluoropolymers for high speed extrusion onto wire. U.S. Pat. No. 4,416,699 describes a method for making such a pigment. The alumina coating on the pigment may be treated with fluoride as disclosed in U.S. Pat. No. 4,460,655. These alumina coatings or those of the type disclosed in U.S. Pat. No. Re. 27,818 are described as amorphous. "Boehmite" type alumina coatings, disclosed in U.S. Pat. No. 3,523,810 are also effective. The amorphous alumina coatings are preferred over the boehmite alumina coatings.

The silica and alumina coated $TiO_2$ of this invention may have a coating of silica on the $TiO_2$ particle and also a coating of alumina. Preferably the $TiO_2$ is coated with silica first, and then the alumina coating is applied over the silica coating. The silica is about 1 to about 20 wt. %, preferably about 1 to about 10 wt. %, and more preferably about 3 to about 6 wt. %. The alumina is about 1 to about 10 wt. %, preferably about 1 to about 5 wt. %, and more preferably at least about 3 wt. %. The weight ratio of alumina to silica is from about 1:10 to about 10:1, preferably from about 3:1 to about 1:3.

The silica-alumina coating of the $TiO_2$ may be modified with boria as disclosed in U.S. Pat. No. 5,753,025.

The $TiO_2$ pigment used in the present invention can also have other oxide coatings under or over the silica and/or alumina coatings. For example, $TiO_2$ pigment coated with silica and then further coated with zirconium, hafnium, or titanium oxide coatings is disclosed in U.S. Pat. No. 3,859,109. $TiO_2$ coated first with other oxides are described in U.S. Pat. No. 6,200,375.

These coated pigments may be further treated with organic materials, sometimes referred to as dispersants, such as organosilane, according to the teachings of this invention. The organosilane has the formula $SiR_1R_2R_3R_4$. At least one R group is a non-hydrolyzable non-functional organic group and at least one R group is a hydrolyzable group selected from the group consisting of alkoxy, acetoxy, hydroxy or halide, the remaining R groups being selected from the group consisting of said non-hydrolyzable organic group and said hydrolyzable group. Silane coatings are disclosed in U.S. Pat. No. 5,562,990. The organic treatment may also be a polysiloxane, such as polydimethylsiloxane, as disclosed in U.S. Pat. No. 4,810,305. Other organic and inorganic treatments are disclosed in U.S. Pat. No. 3,459,091. Silane and polysiloxane treatments are preferred. Where not specified, the treatments are present at a level of from about 0.1 to about 1% by weight.

The concentration of pigment in the fluoropolymer may be from about 0.01 to about 25 weight %, based on the combined weights of fluoropolymer and pigment.

It will be recognized by those skilled in the art that $TiO_2$ pigment is used not only as a white colorant, but may also be mixed with colored inorganic or organic pigments or dyes to impart color. The disclosures of this invention include such combinations of other coloring agents with $TiO_2$ pigment.

The wire coating of this invention is typically about 0.1 to about 40 mils (2.5 to 1000 μm) thick, preferably about 1 to about 20 mils (25 to 500 μm) thick, and more preferably about 2 to about 10 mils (50 to 250 μm) thick, and most preferably about 4 to about 7 mils (100 to 175 μm) thick.

It is desirable that wire coating have as few lumps and sparks as possible. Coated wire made according to the teachings of this invention have fewer than about 10 lumps/135,000 ft (41,000 m) and fewer than about 10 sparks/135,000 ft (41,000 m), preferably fewer than about 5 lumps/135,000 ft (41,000 m) and fewer than about 5 sparks/135,000 ft (41,000 m), and more preferably fewer than about 2 lumps/135,000 ft (41,000 m) and no more than about 2 sparks/135,000 ft (41,000 m).

EXAMPLES

The polymer used in the examples is of the type described in U.S. Pat. Nos. 5,677,404 and 5,700,889. The polymer is a terpolymer of tetrafluoroethylene (TFE), hexafluoropropylene (HFP), and perfluoro(ethyl vinyl ether) (PEVE). The polymer contains about 7 wt. % HFP and 2 wt. % PEVE, the balance being TFE. The melt flow rate (MFR) of the polymer is 30 g/10 min, measured according to American Society for Testing and Materials (ASTM) test D-1238-52T, modified as follows: The cylinder, orifice and piston tip are made of a corrosion-resistant alloy, Stellite 19, made by Deloro Stellite Co, Goshen, Ind. USA. The 5.0 g sample is charged to the 9.53 mm (0.375 inch) inside diameter cylinder, which is maintained at 372° C.±1° C. Five minutes after the sample is charged to the cylinder, it is extruded through a 2.10 mm (0.0825 inch) diameter, 8.00 mm (0.315 inch) long square-edge orifice under a load (piston plus weight) of 5000 grams. The MFR is the observed extrusion rate in units of g/10 minutes.

The polymer flex life is measured according to ASTM D 2176 as described in U.S. Pat. No. 5,703,185 and found to be greater than 2000 cycles.

$TiO_2$ pigments used in the preparing compositions for the examples are:

Type 1—Rutile, 97% minimum $TiO_2$, surface organic coating (0.3 wt % carbon), median particle size 0.22 μm via x-ray disc centrifuge, density of 4.2 g/ml.

Type 2—Rutile, 96% minimum $TiO_2$, surface coating alumina (3.2 wt %)/organic (0.25 wt % carbon), median particle size 0.23 μm via x-ray disc centrifuge, density of 4.1 g/ml.

Type 3—Rutile, 89% minimum $TiO_2$, surface coating silica (5.5 wt %)/alumina (3.3 wt %), median particle size 0.35 μm via x-ray disc centrifuge, density of 3.9 g/ml.

Six other types of pigment were evaluated. They, and the above types, are summarized in Table 1.

TABLE 1

| Type | Composition of $TiO_2$ coating, wt. % based on combined $TiO_2$, $SiO_2$, and $Al_2O_3$ | U.S. Pat. No. | Organic Treatment |
|---|---|---|---|
| 1 | No silica or alumina coating | 5,889,090 | 1% octyltriethoxysilane |
| 2 | 3% $Al_2O_3$ | 4,460,655 | 0.3% trimethylol propane |
| 3 | 6% $SiO_2$/3% $Al_2O_3$ | Re. 27,818 | None |
| 4 | No silica or alumina coating | 2,559,638 | 0.3% triethanolamine |
| 5 | 2.5% $Al_2O_3$ (Boehmite) | 3,523,810 | 0.3% trimethylol propane |
| 6 | 3% $SiO_2$/3% $Al_2O_3$ (Boehmite) | 5,753,025 | 0.3% trimethylol propane |
| 7 | 11% $SiO_2$ (porous)/5% $Al_2O_3$ | 3,591,398 | None |
| 8 | 3% $SiO_2$/3% $Al_2O_3$ (Boehmite) | 5,753,025 | polydimethylsiloxane |
| 9 | 3% $Al_2O_3$ | 5,562,990 | octyltriethoxysilane |

Concentrate Preparation $TiO_2$ pigment is dry-blended with pelletized polymer to yield blends with pigment concentration of about 5 wt %. The dry blends are fed to a 28 mm Kombiplast twin screw extruder and compounded at about 330° C. The extrudate is quenched with water and chopped into pellets. This is the melt-blended concentrate.

Melt flow properties of the melt-blended concentrates are summarized in Table 2.

TABLE 2

| Pigment Type in Blend Sample | Melt Flow Rate (g/10 min) |
|---|---|
| 1 | 24.3 |
| 2 | 27.4 |
| 3 | 29.6 |
| 4 | 30.6 |
| 5 | 29.8 |
| 6 | 30.5 |
| 7 | 31.4 |
| 8 | 32.3 |
| 9 | 27.4 |

Example 1

Melt blended concentrate is dry-blended with polymer in a ratio of 1:99 to obtain blends containing 500 ppm pigment. These blends are then used to extrude white insulation onto AWG 24 solid copper conductor using a 45 mm diameter Nokia Maillefer single screw extruder (Concord, Ontario, Canada) having length/diameter of 30/1, equipped with a B&H Tool Co. (San Marcos, Calif. USA) 75 crosshead, a screw with mixing head, a 0.275 inch (7.00 mm) diameter die, and a 0.152 inch (3.86 mm) diameter guider tip. Melt temperature is about 790° F., (420° C.). Line speed is about 2000 ft/minute (10 m/s) and drawdown ratio is about 70/1. The extrudate is air cooled for about 40 ft (12 m), passed through a 48 foot (15 m) water bath, then traveled in air through a bead-chain spark tester operating at 2.5 kV to a takeup system. Resultant wire coating thickness is 0.007 inches (0.18 mm). At startup unpigmented polymer is fed to the extruder until the line is up to speed and running normally. Then the extruder feed is transitioned to the blend. Approximately 135,000 ft (41,000 m) of wire coated with each compositioned is produced. Additionally, a 90,000 foot (27,500 m) quantity of wire is produced with the natural fluoropolymer resin (no pigment). Results are summarized in Table 3.

The wire coating made using no pigment has no lumps and five sparks in 90,000 ft (27,500 m). The wire coating made from the composition containing alumina or alumina/silica coated pigments has no more than 3 lumps and 8 sparks. Most compositions have no lumps and 5 or fewer sparks. Wire coating from polymer pigmented with pigment not coated with oxide has up to 4 lumps and 87 sparks. These results show the benefit of fluoropolymer compositions containing alumina or alumina/silica coated pigments in high-speed extrusion for wire coating.

TABLE 3

| Type | Composition of TiO$_2$ coating, wt. % based on combined TiO$_2$, SiO$_2$, and Al$_2$O$_3$ | Sparks | Lumps |
|---|---|---|---|
| 1 | No silica or alumina coating | 87 | 2 |
| 2 | 3% Al$_2$O$_3$ | 5 | 0 |
| 3 | 6% SiO$_2$/3% Al$_2$O$_3$ | 3 | 0 |
| 4 | No silica or alumina coating | 13 | 4 |
| 5 | 2.5% Al$_2$O$_3$(Boehmite) | 8 | 3 |
| 6 | 3% SiO$_2$/3% Al$_2$O$_3$(Boehmite) | 5 | 1 |
| 7 | 11% SiO$_2$ (porous)/5% Al$_2$O$_3$ | 3 | 0 |
| 8 | 3% SiO$_2$/3% Al$_2$O$_3$(Boehmite) | 3 | 0 |
| 9 | 3% Al$_2$O$_3$ | 3 | 0 |
| — | Unpigmented polymer | 5 | 0 |

The tests in the Example show that fluoropolymers pigmented with TiO$_2$ coated with oxide, when melt-extruded onto a conductor, gives a wire coating with few defects.

Example 2

At conditions similar to those Example 1, but using a 60 mm Nokia Mallaifer extruder, at a melt temperature of 776° F. (413° C.), die and tip temperatures of 745° F. (396° C.), polymer is extruded onto AWG 24 solid copper conductor at 3000 ft/min (15 m/s). When extrusion is proceeding normally, the extruder feed is transitioned to a blend containing 500 ppm of Type 3 pigment. The wire coating made is found to have no lumps and one spark in 315,000 ft (96,000 m) of coated conductor.

What is claimed is:

1. A process for the coating of a conductor comprising melt extruding onto said conductor a blend comprised of
   (a) melt-processible fluoropolymer having a flex life of greater than about 1000 cycles, and capable of being extruded by itself at at least about 2500 ft/min (12.7 m/s) and
   (b) a pigment comprising titanium dioxide coated with one or more layers comprising oxides, or mixtures of oxides, of at least one of silicon and aluminum, said extruding being at a rate of at least about 2000 ft/min (10 m/s) to give a conductor with a coating having no more than about 10 lumps/135,000 ft (41,000 m) or no more than about 10 sparks/135,000 ft (41,000 m).

2. The process of claim 1 wherein the melt-processible fluoropolymer is a copolymer of tetrafluoroethylene.

3. The process of claim 1 wherein the melt-processible fluoropolymer is a copolymer of tetrafluoroethylene and hexafluoropropylene.

4. The process of claim 1 wherein the melt-processible fluoropolymer is a copolymer of tetrafluoroethylene and perfluoro(alkyl vinyl ether).

5. The process of claim 1 wherein the melt-processible fluoropolymer is a copolymer of tetrafluoroethylene, hexafluoropropylene, and perfluoro(ethyl vinyl ether).

6. The process of claim 5 wherein the hexafluoropropylene content of the fluoropolymer is about 6 wt. % to about 16 wt. %, and the perfluoro(ethyl vinyl ether) content of the fluoropolymer is about 0.2 wt. % to about 4 wt. %.

7. The process of claim 1 wherein the melt-processible fluoropolymer has a melt flow rate of about 15 to about 50.

8. The process of claim 1 wherein the layer of oxide of silicon is from about 1 to about 20 wt. % of the total weight of the pigment and the layer of oxide of aluminum is from about 1 to about 10 wt. % of the total weight of the pigment.

9. The process of claim 1 wherein said pigment is about 0.01% to about 25% of the total weight of the blend.

10. The process of claim 1 wherein the rate is greater than about 2500 ft/min (13 m/s).

11. The process of claim 1 wherein the coating has fewer than about 10 lumps/135,000 ft (41,000 m) and fewer than about 10 sparks/135,000 ft (41,000 m).

12. A composition capable of being melt-extruded onto a conductor at a rate of at least about 2000 ft/min (10 m/s) comprised of (a) melt-processible fluoropolymer having a flex life greater than about 1000 cycles, and capable of being extruded by itself at at least about 2500 ft/min (12.7 m/s) and (b) pigment comprising titanium dioxide coated with one or more layers comprising oxides, or mixtures of oxides, of at least one of silicon and aluminum.

13. The composition of claim 12 wherein the melt-processible fluoropolymer is a copolymer of tetrafluoroethylene.

14. The composition of claim 12 wherein the melt-processible fluoropolymer is a copolymer of tetrafluoroethylene and hexafluoropropylene.

15. The composition of claim 12 wherein the melt-processible fluoropolymer is a copolymer of tetrafluoroethylene and perfluoro(alkyl vinyl ether).

16. The composition of claim 12 wherein the melt-processible fluoropolymer is a copolymer of tetrafluoroethylene, hexafluoropropylene, and perfluoro (ethyl vinyl ether).

17. The composition of claim 16 wherein the hexafluoropropylene content of the fluoropolymer is about 6 wt. % to about 16 wt. %, and the perfluoro(ethyl vinyl ether) content of the fluoropolymer is about 0.2 wt. % to about 4 wt. %.

18. The composition of claim 12 wherein the melt-processible fluoropolymer has a melt flow rate of about 15 to about 50.

19. The composition of claim 12 wherein the layer of oxide of silicon is from about 1 to about 20 wt. % of the total weight of the pigment and the layer of oxide of aluminum is from about 1 to about 10 wt. % of the total weight of the pigment.

20. The composition of claim 12 wherein said pigment is about 0.01% to about 25% of the total weight of the blend.

* * * * *